(12) United States Patent
Knauth

(10) Patent No.: US 12,447,590 B2
(45) Date of Patent: Oct. 21, 2025

(54) INFINITELY ADJUSTABLE DRIVER SHANK QUICK CONNECT

(71) Applicant: Klein Tools, Inc., Lincolnshire, IL (US)

(72) Inventor: Jerry C. Knauth, Mansfield, TX (US)

(73) Assignee: Klein Tools, Inc., Lincolnshire, IL (US)

( * ) Notice: Subject to any disclaimer, the term of this patent is extended or adjusted under 35 U.S.C. 154(b) by 378 days.

(21) Appl. No.: 18/297,934

(22) Filed: Apr. 10, 2023

(65) Prior Publication Data

US 2024/0335925 A1    Oct. 10, 2024

(51) Int. Cl.
*B25B 23/00* (2006.01)
*B25B 23/16* (2006.01)

(52) U.S. Cl.
CPC .......... *B25B 23/0042* (2013.01); *B25B 23/16* (2013.01)

(58) Field of Classification Search
CPC ....... B25B 23/0042; B25B 23/16; F16B 7/14; F16B 7/1409; F16B 7/1436; F16B 7/1463; F16B 7/149; B25G 1/04; B25G 1/043

See application file for complete search history.

(56) References Cited

U.S. PATENT DOCUMENTS

| | | | | |
|---|---|---|---|---|
| 5,078,349 A * | 1/1992 | Smith | ................. | A61M 5/1415 403/109.5 |
| 5,492,430 A * | 2/1996 | Jones | ..................... | F16B 7/149 403/109.5 |
| 5,924,658 A * | 7/1999 | Shiery | ................... | F16B 7/1409 248/161 |
| 6,155,143 A * | 12/2000 | Wu | ........................ | B25G 1/043 81/436 |
| 6,363,820 B1* | 4/2002 | Hsiao | ................. | B25B 23/0035 81/439 |
| 6,901,826 B2* | 6/2005 | Huang | ................ | B25B 23/0021 81/177.2 |
| 7,146,885 B2* | 12/2006 | Hwang | .................. | B25B 15/04 81/436 |
| 11,173,585 B2* | 11/2021 | Gauthier | ............ | B25B 23/0007 |
| 2010/0176562 A1* | 7/2010 | Linzell | ................. | B25B 13/461 279/158 |
| 2011/0079116 A1* | 4/2011 | Hu | ..................... | B25B 23/0042 81/439 |

* cited by examiner

*Primary Examiner* — David B. Thomas

(57) ABSTRACT

A driver include: an axis, a shank with a handle engagement portion, and a handle configured to releasably and continuously adjustably fix the shank in position. The handle includes a sleeve with two slots axially oriented, first and second handle portions, a torsion spring between the handle portions, and two retaining balls riding in the two slots and disposed in the first handle portion and biased apart. With the first handle portion in a rotationally neutral position, the retaining balls are pressed against the shank, fixing the shank in position. Rotating the first handle portion with respect to the second handle portion releases the retaining balls and allows the shank to be adjusted in the handle.

19 Claims, 14 Drawing Sheets

INFINITELY ADJUSTABLE DRIVER SHANK QUICK CONNECT

BACKGROUND

Hand tools are used for a wide variety of tasks in a myriad of settings. A common type of hand tool is a driver, for example, screwdrivers, nut drivers, and the like. At the simplest level, drivers include a handle for the user to grip, a head to make contact with the screw, nut, or other object to be tightened, loosened, attached to, or detached from a second object, and a shank (or shaft) connecting the handle to the head of the driver. Driver heads may be formed out of the end of the shank opposite the handle or the end of the shank may be designed to interchangeably accept a variety of heads, for example, a set of sockets designed to turn nuts of a variety of sizes. Drivers may also be distinguished by the length of the shank from the handle to the head of the driver.

BRIEF SUMMARY

One or more embodiments of the disclosure provide a driver that includes: an axis; a shank oriented along the axis and including: a tip end; and a handle engagement portion disposed opposite the tip end; a handle configured to releasably and continuously adjustably fix the shank in position, the handle including: a sleeve that fits closely around the shank without unilaterally fixing the shank in position, the sleeve comprising two slots extending through the sleeve and oriented in an axial direction; a first outer handle portion configured to rotate about the axis and the sleeve and disposed over a first end of the sleeve, the first outer handle portion including a chamber oriented in the axial direction and opening to the two slots, the chamber including a first and a second demi-chamber, each demi-chamber oriented in the axial direction and azimuthally adjacent, the first demi-chamber including two oppositely sloping surfaces at opposite ends of the first demi-chamber, each sloping surface sloping toward the sleeve toward a respective end of the first demi-chamber, the second demi-chamber similar to the first demi-chamber but does not include sloping surfaces; a second outer handle portion adjacent to and axially fixed with respect to the first outer handle portion and disposed over a second end of the sleeve; an azimuthal orientation restorer operably engaged with the first and second outer handle portions and configured to restore a neutral azimuthal orientation between the first and second outer handle portions that fixes the position of the shank with respect to the handle; and two retaining balls at least partially disposed in the chamber and biased away from each other along the axis, each retaining ball partially disposed in a respective one of the slots, each retaining ball including a diameter greater than a width of the respective one of the slots and small enough in diameter to make contact with the shank via the respective one of the slots; where the two retaining balls occupy the first demi-chamber while the first and second outer handle portions are in the neutral azimuthal orientation and, extend through the respective one of the slots to press and retain the shank against the sleeve, and where the two retaining balls occupy the second demi-chamber while the first outer handle portion is rotated azimuthally with respect to the second outer handle portion and allow the shank to move axially with respect to the handle.

DETAILED DESCRIPTION

Drivers such as screwdrivers, nut drivers, and the like are available in a range of discrete shank lengths. To use a variety of drivers of different shank lengths allows a user to access the right tool for a particular job. However, having access to such a variety of tools often requires purchasing them, storing them, a transporting them to a worksite. In addition, even with the available variety, drivers are typically available in shank lengths that vary by some amount, perhaps in steps of inches. Thus, a driver that permits an infinitely (continuous) adjustment of shank length can reduce cost, storage requirements, and transportation effort. A quick connect may further enhance the attractiveness of a continuously adjustable driver.

Figure 1:
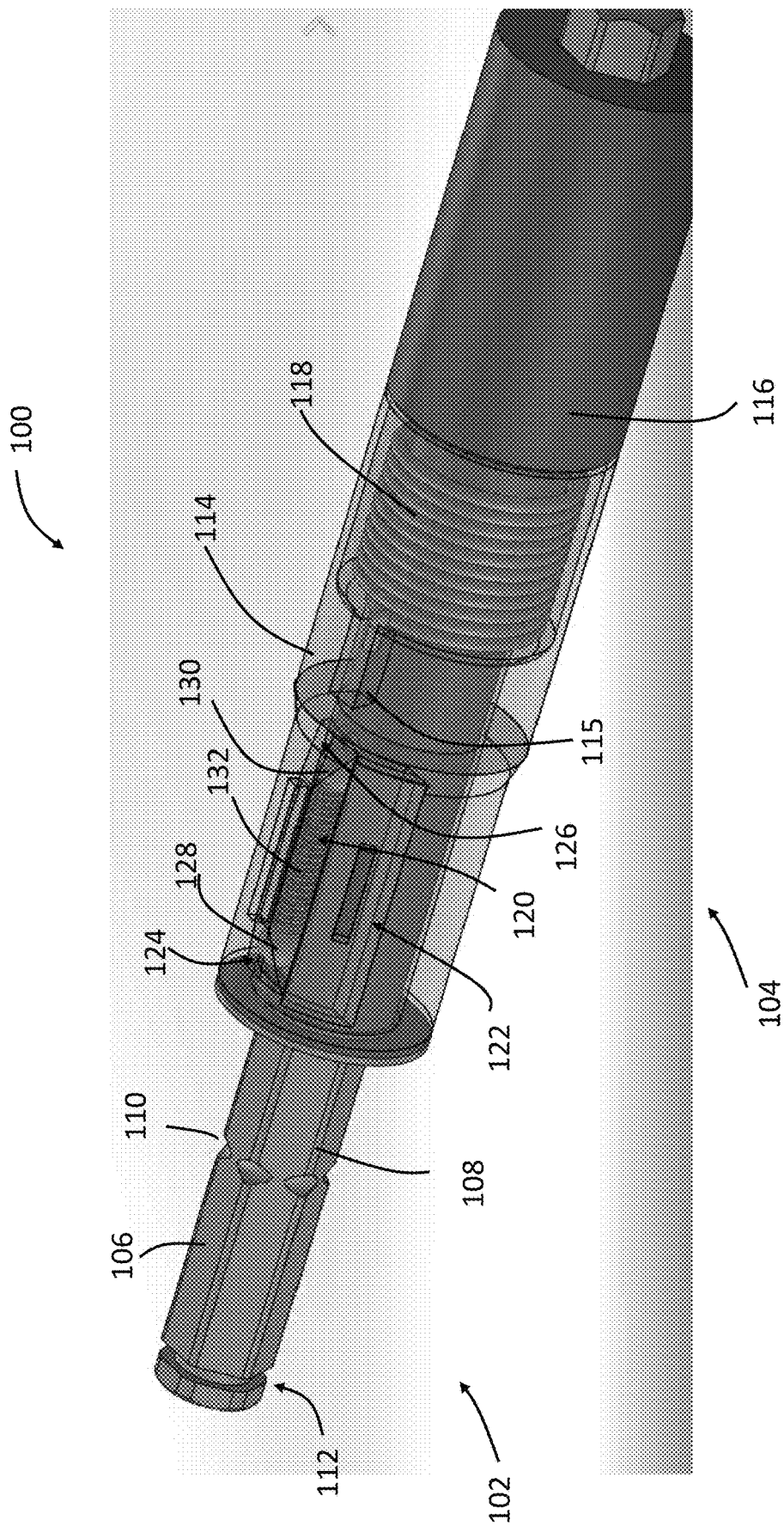
FIG. 1 depicts a partially transparent perspective view of a driver handle holding a driver shank in accordance with one or more aspects of the disclosure.

Referring to FIG. 1, a driver 100 includes a shank 102 and a handle 104. The shank 102 may have a circular cross section when viewed along the axis of the driver 100, that is, the axis along which the shank 102 lies and about which the driver 100 turns when in use. In other cases, the shank may have a non-circular cross section. A cross section could be oval or elliptical. However, more often, the cross sectional shape of the shank is a polygon and in particular, a regular polygon.

A polygon, as used herein, is a plane figure bounded by a finite chain of straight line segments closing in a loop to form a closed chain (Wikipedia). Examples of polygons include triangle, square, rectangle, pentagon, hexagon, heptagon, octagon, and the like. Regular polygons have each line segment of equal length and each of the angles subtended by adjacent pairs of line segments being equal.

Referring again to FIG. 1, the shank 102 in this illustration is a regular hexagon. In three dimensions, straight line segments become planar surfaces 106. These planar surfaces 106 may connect to adjacent planar surfaces with a sharp edge or, as shown in FIG. 1, the edges may be softened 108. A driver shank 102 may include other features such as notches 110 or a groove 112 around the circumference of the shank 102. A groove 112 may have sharp, square edges as shown here, or they may be rounded, as will be shown below.

The shank 102 may be made of a metal or metal alloy including all types of steels, including stainless steel, tool steel, S2 steel (shock-resisting tool steel), carbon steel, aluminum, copper, titanium, and other metals and metal alloys. The shank 102 may be chrome-plated for corrosion resistance and added durability. Shanks may come in a variety of lengths (as defined from the tip of the shank to the near edge of the driver handle). Common lengths include 2, 3, 4, 6, 7, 8, 9, 10, and 12 inches, and other lengths are in use as well.

The shank 102 may have a circular cross section or a non-circular cross section. Non-circular cross sections include oval, elliptical, or polygonal. A polygon may be a regular polygon where each side is a straight line of equal length (equilateral) and the angles subtended by each adjacent pair or sides are also equal. The straight line of a polygonal cross section translates to a planar surface on the shank. In practice, adjacent planar surfaces of a shank may share a sharp edge or a slightly rounded edge.

Shanks may have additional features of secondary visual prominence to the dominant shape of the shank. These additional features include notches, grooves, rings, protrusions, and the like. These additional features may be rectilinear in shape or may be more smoothly curved.

Still referring to FIG. 1, the handle 104 includes a first outer handle portion 114 and a second outer handle portion 116. These two outer handle portions 114, 116 are adjacent to each other in the axial direction and able to rotate with respect to one another. An azimuthal orientation restorer may be disposed between the first and second outer handle portions 114, 116. The azimuthal orientation restorer may include a first end fixed with respect to the first outer handle portion 114 and a second end fixed with respect to the second outer handle portion 116. After the first outer handle portion 114 is rotated relative to the second outer handle portion 116, the azimuthal orientation restorer rotates the first outer handle portion 114 back to a neutral azimuthal orientation relative to the second outer handle portion 116. The azimuthal orientation restorer may be a torsion spring, an extension spring, a compression spring, a band of elastomeric material, devices and objects that exhibit a restoring force when deformed, and the like. As depicted in FIG. 1, a torsional spring 118 has one end fixed in the first outer handle portion 114 (at box 115) and the other end fixed in the second outer handle portion 116. The torsional spring 118 provides a rotational restoring force to bring the azimuthal orientation of the first outer handle portion 114 back to a neutral azimuthal orientation with respect to the second outer handle portion 116. Such a neutral orientation (or position) is depicted in FIG. 1. In this neutral orientation, the shank 102 is fixed in place with respect to handle 104.

The first outer handle portion 114 is configured to rotate about the axis and includes a cylindrical inner diameter that allows the first outer handle portion 114 to rotate with respect to the sleeve (shown in later figures). In one or more embodiments, the sleeve may have a cylindrical outer diameter that corresponds to the cylindrical inner diameter of the first outer handle portion 114. In one or more other embodiments, the outer shape of the sleeve may be irregular, an irregular polygon, a regular polygon, a polygon with rounded edges, and the like, provided that the first outer handle portion 114 may rotate with respect to the sleeve.

The first outer handle portion 114 includes a chamber oriented in the axial direction and opening inwardly toward the axis. The first outer handle portion 114 includes two demi-chambers 120, 122. Each demi-chamber is oriented in the axial direction and azimuthally adjacent to the other. The first demi-chamber 120 includes two oppositely sloping surfaces 124, 126 at opposite ends of the first demi-chamber 120, each sloping surface 124, 126 sloping toward the axis and the sleeve (not shown here) toward a respective end of the first demi-chamber 120.

The handle may be made of one or more various materials. The first outer handle portion 114 and the second outer handle portion 116 (when it is not a single piece with the sleeve) may include one or more of the following: polypropylene, acrylonitrile butadiene styrene (ABS plastic), cellulose acetate, polycarbonate, polyvinyl chloride, polyethylene, polystyrene, polyamide, fiberglass, acetal, acrylic, stainless steel, tool steel, carbon steel, alloy steel, iron, aluminum, tungsten, titanium, and the like as well as wood and other rigid materials.

In FIG. 1, two retaining balls 128, 130 that are separated by a compression spring 132 are housed between the first demi-chamber 120 and a sleeve (shown later). In this figure, compression spring 132 is pushing retaining balls 128, 130 against the sloping surfaces 124, 126, respectively, which pushing the retaining balls toward the axis and toward the shank 102, securing the shank in place against a sleeve (shown later).

More generally, the two retaining balls 128, 130 are biased away from each other along the axis. The biasing force may be provided by a single compression spring between the retaining balls 128, 130, as described above. However, the biasing force may be provided in other ways. As one example, a wall may exist between the two retaining balls 128, 130. For each retaining ball 128, 130, an elastic element, say a compression spring, may extend from the retaining ball to the proximate side of the wall. Each elastic element may exert a biasing force on the respective retaining ball away from the other retaining ball.

Each retaining ball 128, 130 may comprise one or more of steel, stainless steel, tool steel, carbon steel, alloy steel, iron, aluminum, tungsten, or titanium.

The second demi-chamber 122 is similar, in some cases identical to, first demi-chamber 120 except that the second demi-chamber 122 does not have sloping surfaces that would push the retaining balls 128, 130 radially inward toward the axis.

Figure 2:
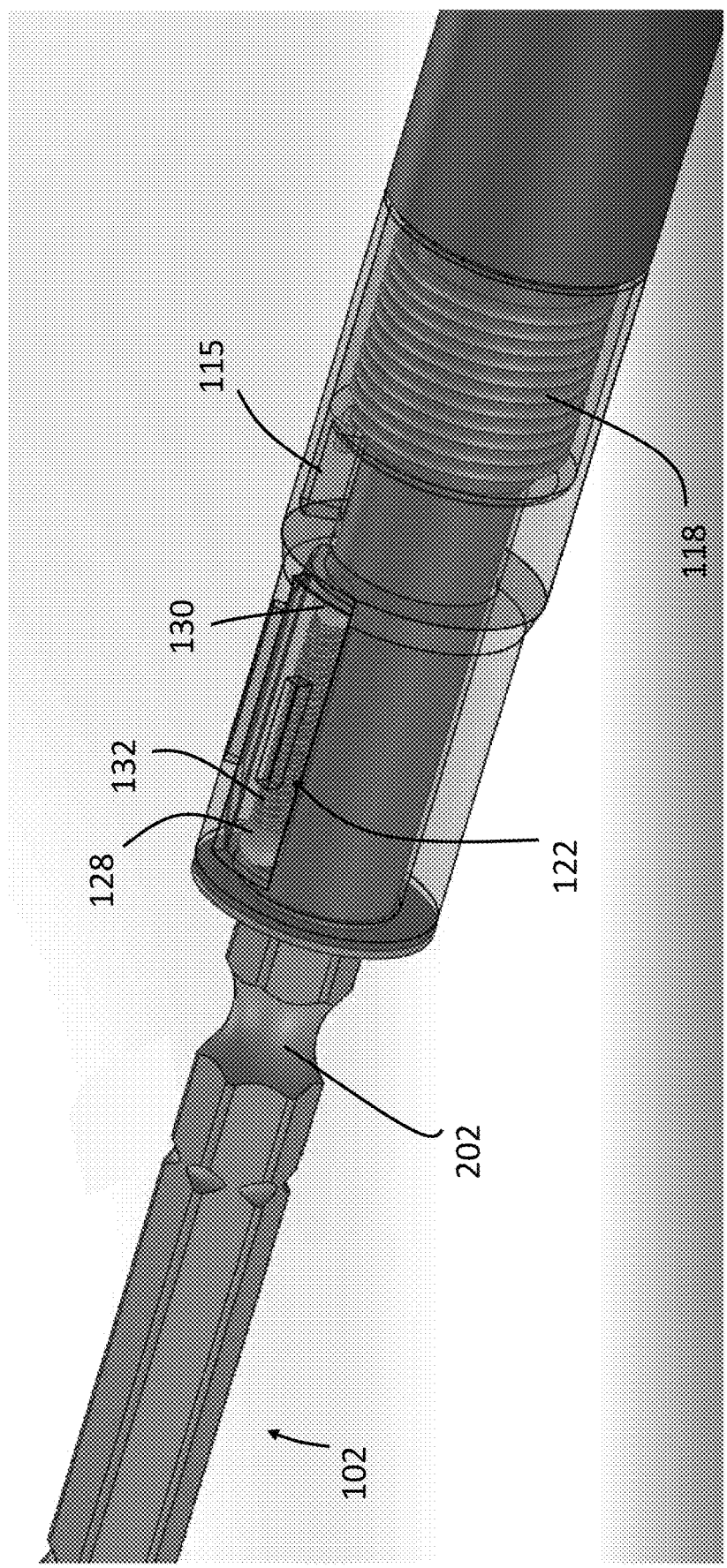
FIG. 2 depicts a partially transparent perspective view of a driver handle releasing a driver shank in accordance with one or more aspects of the disclosure.

FIG. 2 depicts the driver 100 when the shank 102 is free to slide in and out of the handle in the axial direction. With shank 102 largely removed from the handle, FIG. 2 allows a large groove 202 near the handle engagement end of the shank to be seen. This large groove 202 may be referred to as an impact driver detent groove.

Looking at the handle 104, it can be seen that box 115 that holds one end of torsional spring 118 is rotated along with first outer handle portion 114 with respect to FIG. 1. In this position, retaining balls 128, 130 and compression spring 132 are now in the second demi-chamber 122. With no sloping surfaces in the second demi-chamber 122, the retaining balls 128, 130 are not pressed in the radial direction toward the shank 102 and the shank is free to slide. This approach to locking (fixing, retaining) and releasing the shank allows for infinitely small variations of shank length so that the variation is continuous.

Figure 3:
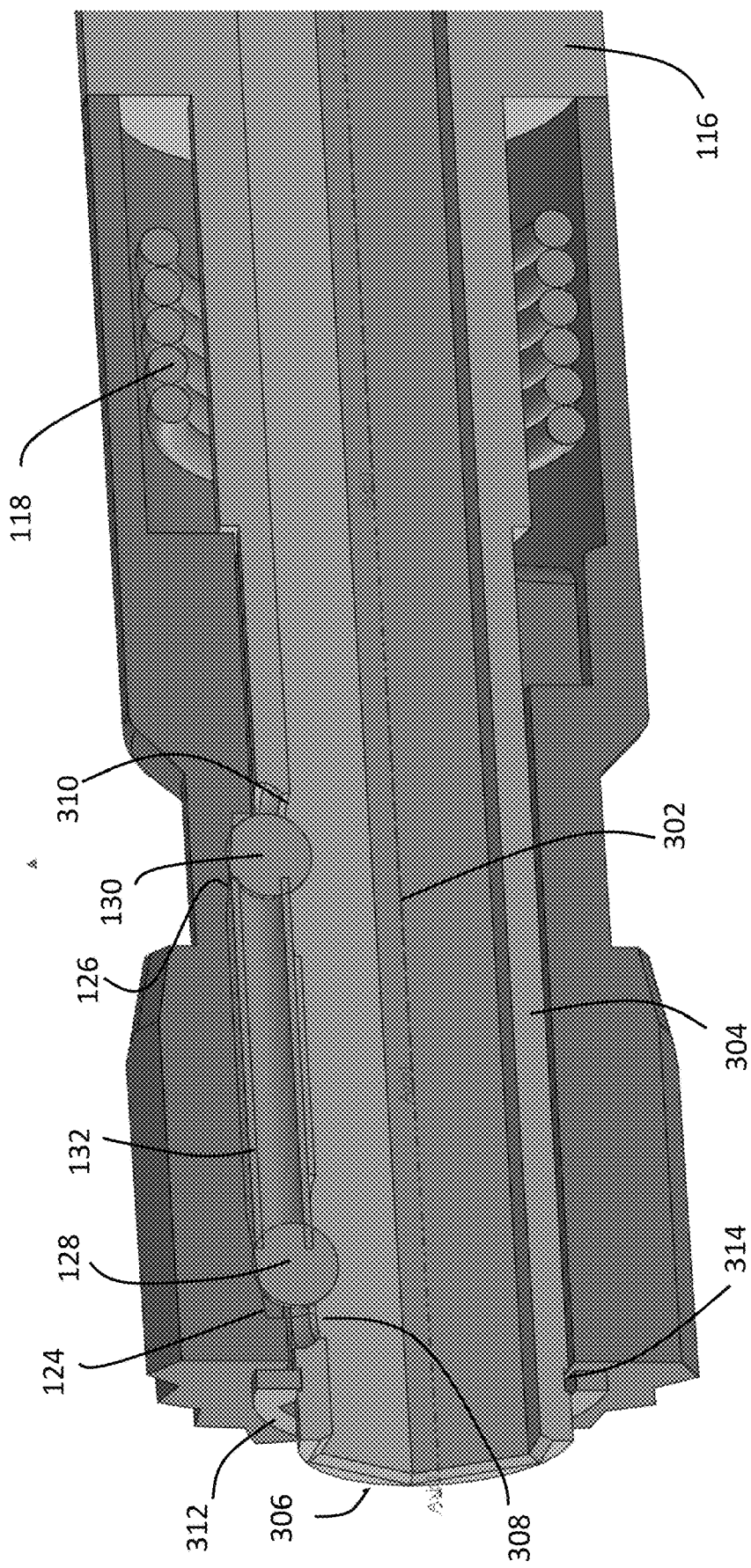
FIG. 3 depicts a cross-sectional view of a driver handle in accordance with one or more aspects of the disclosure.

FIG. 3 depicts a portion of the driver handle in cross section. The axis 302 is now seen as is sleeve 304. In this depiction, sleeve 304 is connected to the second outer handle portion 116. In other embodiments, the sleeve 304 and the second outer handle portion 116 may be separate pieces, but these two pieces would be rotationally fixed to each other such that each of the two pieces would undergo an equal and simultaneous rotation about the axis 302. The sleeve 304, as depicted in FIG. 3, has a cylindrical outer diameter 306 that allows the first outer handle portion 114 that surrounds it and has a corresponding cylindrical inner diameter to rotate around the axis 302. The outer surface of the sleeve 304 may be a shape other than cylindrical provided that the first outer handle portion may rotate around the sleeve 304 when releasing the retaining balls 128, 130. For example, the outer surface of the sleeve may be a polygon. The sleeve 304 is configured to fit closely around the shank 102 without unilaterally fixing the shank 102 in position. The sleeve 304 includes two slots 308, 310 extending through the sleeve 304 and oriented in the axial direction. These two slots 308, 310 allow retaining balls 128, 130 to make contact with shank 102 when the shank is in sleeve 304. Each retaining ball 128, 130 is configured to ride along its respective slot 308, 310. As shown here, slots 308 and 310 are collinear. However, collinearity of the slots is not required. In some embodiments, the two slots 308 and 310 may be defined by a single slot extending parallel to the axis. (See FIG. 14 and related discussion below.) This figure also shows the sloping surfaces 124, 126 that are configured to apply a radially inward force on the retaining balls against the shank 102. In addition, sleeve 304 is kept in fixed position axially with respect to the handle because of a fastener. In this illustration, a c-clip 312 is to securely fit in the circumferential notch 314 in the sleeve 304. Other means of keeping the sleeve 304 fixed in position with respect to the handle may also be used. For example, the sleeve may be press fit into the handle, requiring no fastener.

Figure 4:
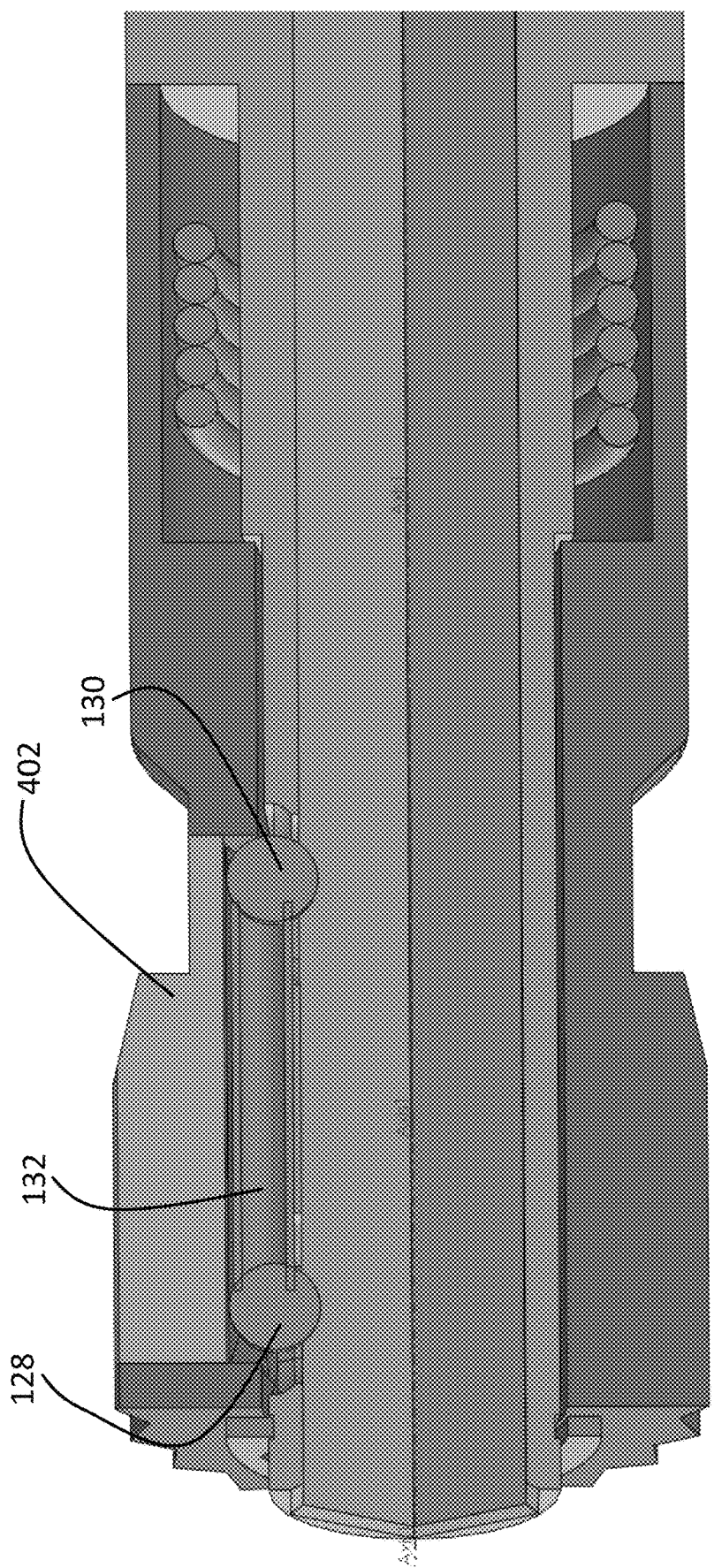
FIG. 4 depicts another cross-sectional view of a driver handle in accordance with one or more aspects of the disclosure.

FIG. 4 shows a cross-sectional view of the driver handle and is similar in many ways to previous views. Of note is removable section 402 of the first outer handle portion. The removable section allows for the insertion (or removal) of the retaining balls 128, 130 and the compression spring 132. Note also that removable section 402 includes at least part of the second demi-chamber because there are no sloping surfaces present in the chamber holding the retaining balls.

Figure 5:
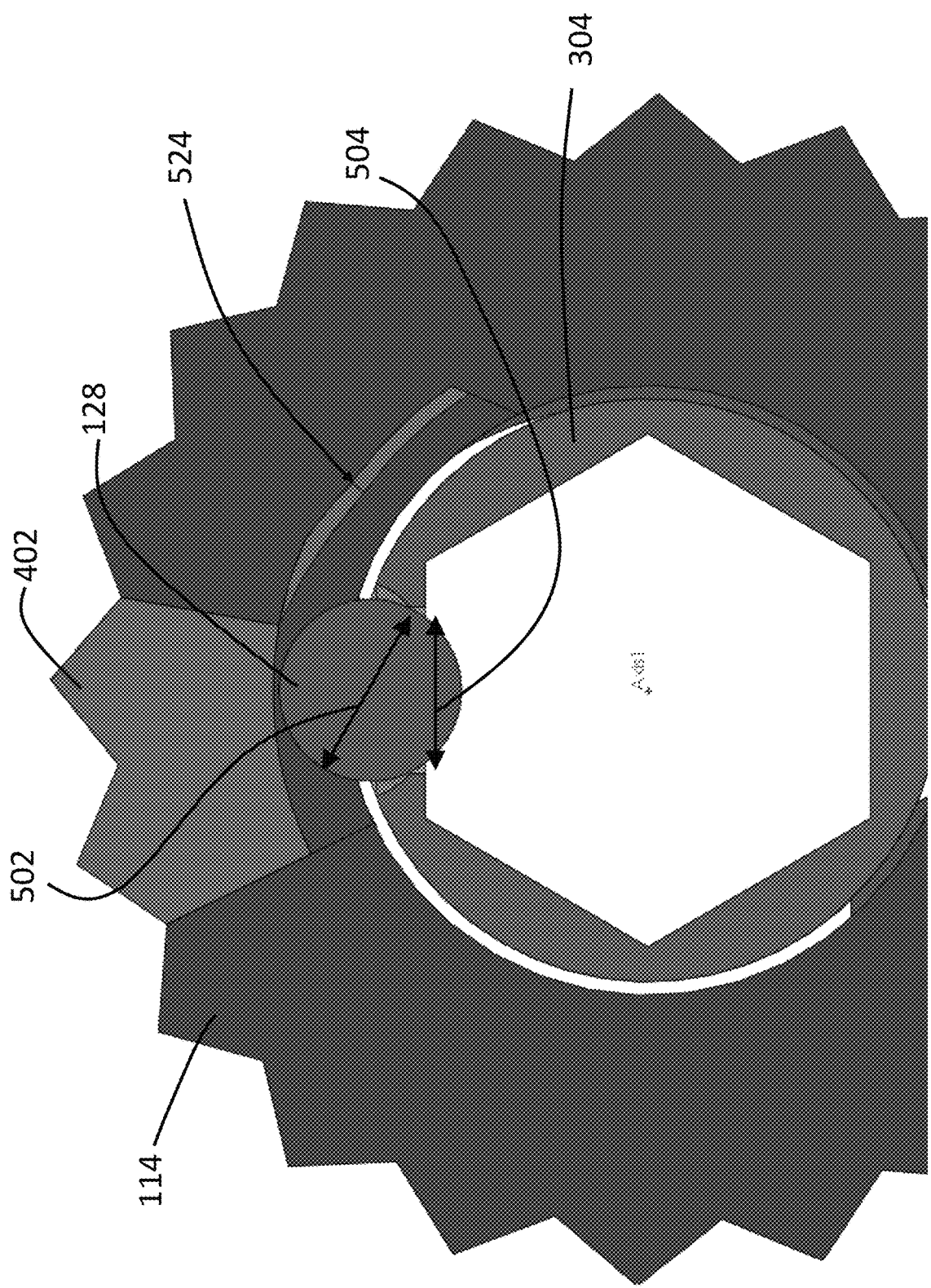
FIG. 5 depicts a cross-sectional view along an axis of a driver handle in accordance with one or more aspects of the disclosure.

Referring now to FIG. 5, an axial cross-section view of the driver handle looking toward the tip of the shank is depicted. The diameter 502 of each retaining ball 128, 130 is greater that the width 504 of the slots in the sleeve 304. Thus, the retaining balls 128, 130 cannot slip through the slots. On the other hand, the diameter 502 of the retaining balls is not so great that the retaining balls do not extend through the slots and make contact with and apply force against the shank 102 of the driver.

A sloping surface 524 of the chamber will force retaining ball 128 radially inward against a shank inserted in the sleeve 304 when the first outer handle portion 114 is rotated counterclockwise (as viewed in FIG. 5) relative to the sleeve 304, securing the shank in place in the driver handle. This rotation would restore the first outer handle portion 114 to a neutral azimuthal orientation relative to the second out handle portion.

Figure 6:
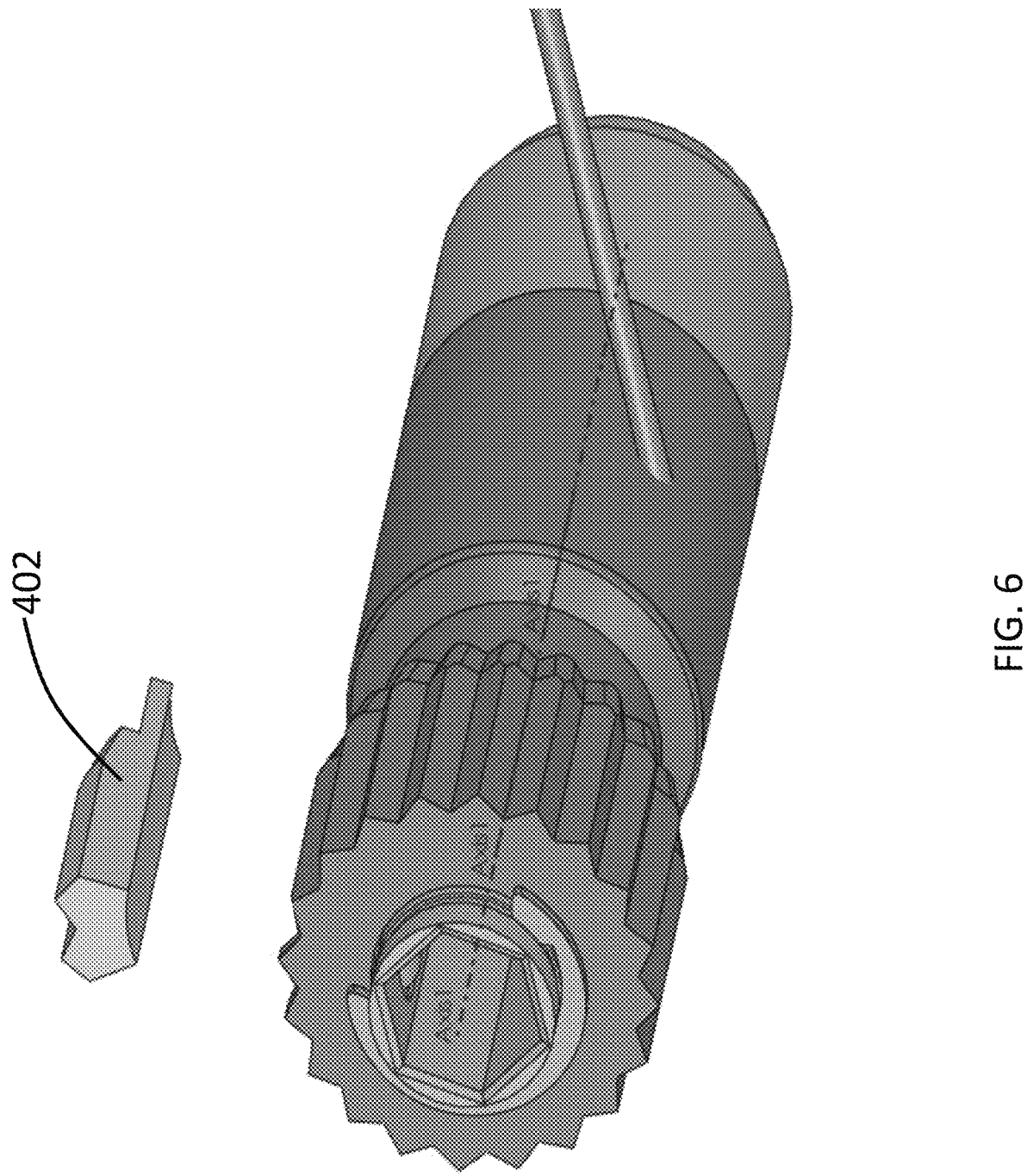
FIG. 6 depicts a perspective view of a driver handle in accordance with one or more aspects of the disclosure.

FIG. 6 presents a perspective view of driver handle including removable segment 402 being depicted in a partially blown out view.

Figure 7:
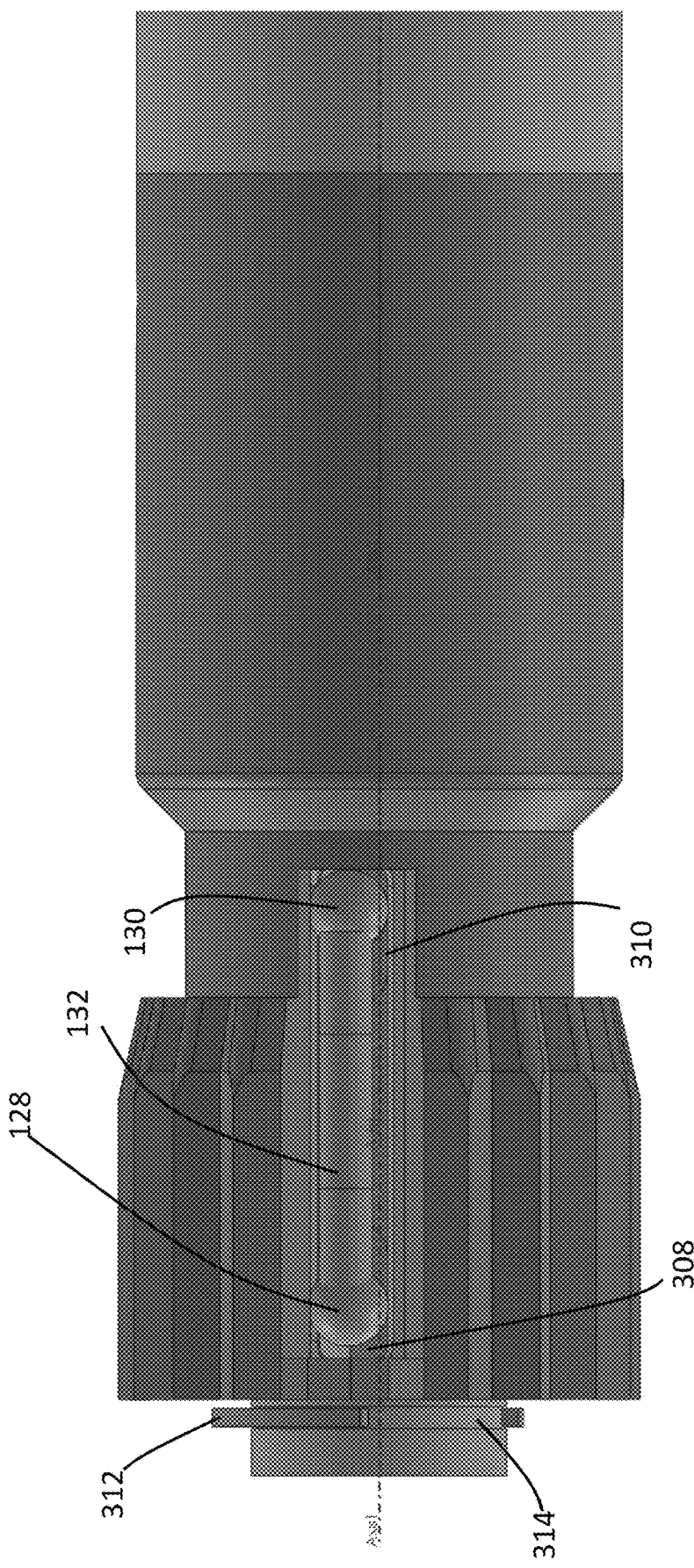
FIG. 7 depicts a top view of a driver handle in accordance with one or more aspects of the disclosure.

FIG. 7 is, in a sense, a continuation of the perspective view of FIG. 6 with the removable segment 402 taken out. In FIG. 7, a top 3D view is provided. Looking in from the top of the handle, retaining balls 128, 130 separated by compression spring 132 are depicted. Further, the slots 308, 310 in sleeve 304 are seen below the retaining balls.

Figure 8:
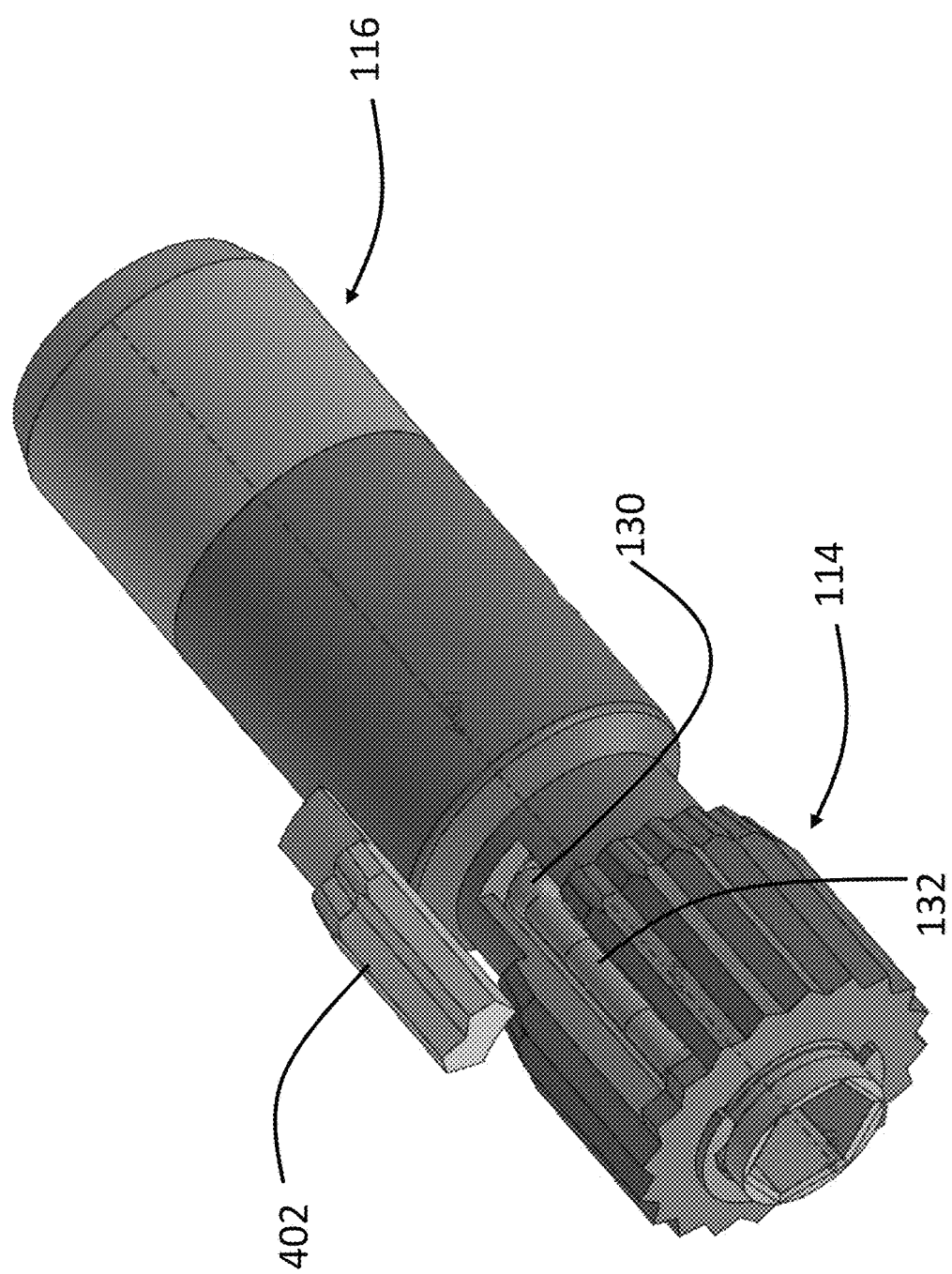
FIG. 8 depicts a perspective view of a driver handle in accordance with one or more aspects of the disclosure.

Referring now to FIG. 8, a perspective view is shown of the driver handle including the first outer handle portion 114 and the second outer handle portion 116. The removable section 402 of the first outer handle portion 114 allows one 130 of the two retaining balls and the compression spring 132 to be viewed.

Figure 9:
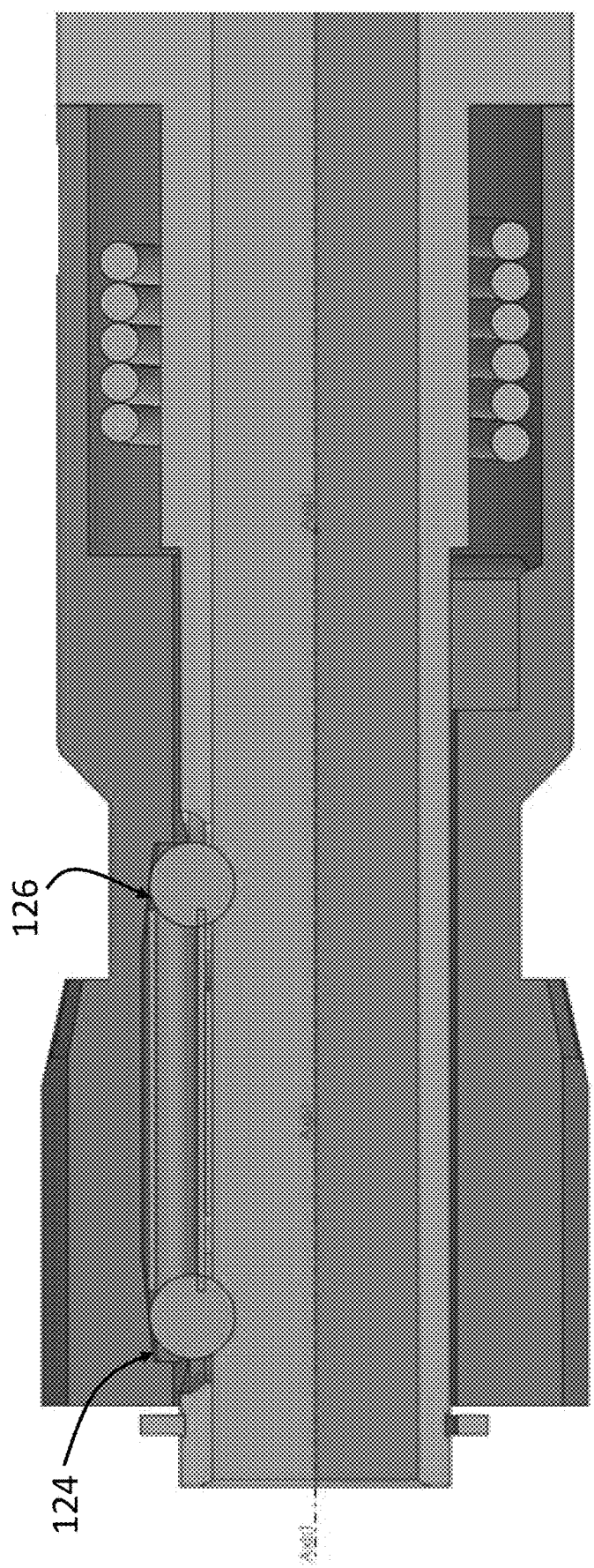
FIG. 9 depicts a cross-sectional view of a driver handle in accordance with one or more aspects of the disclosure.

In FIG. 9, a cross sectional view of the driver handle is depicted. Of particular clarity are the sloping surfaces 124, 126 of the first demi-chamber.

Figure 10:
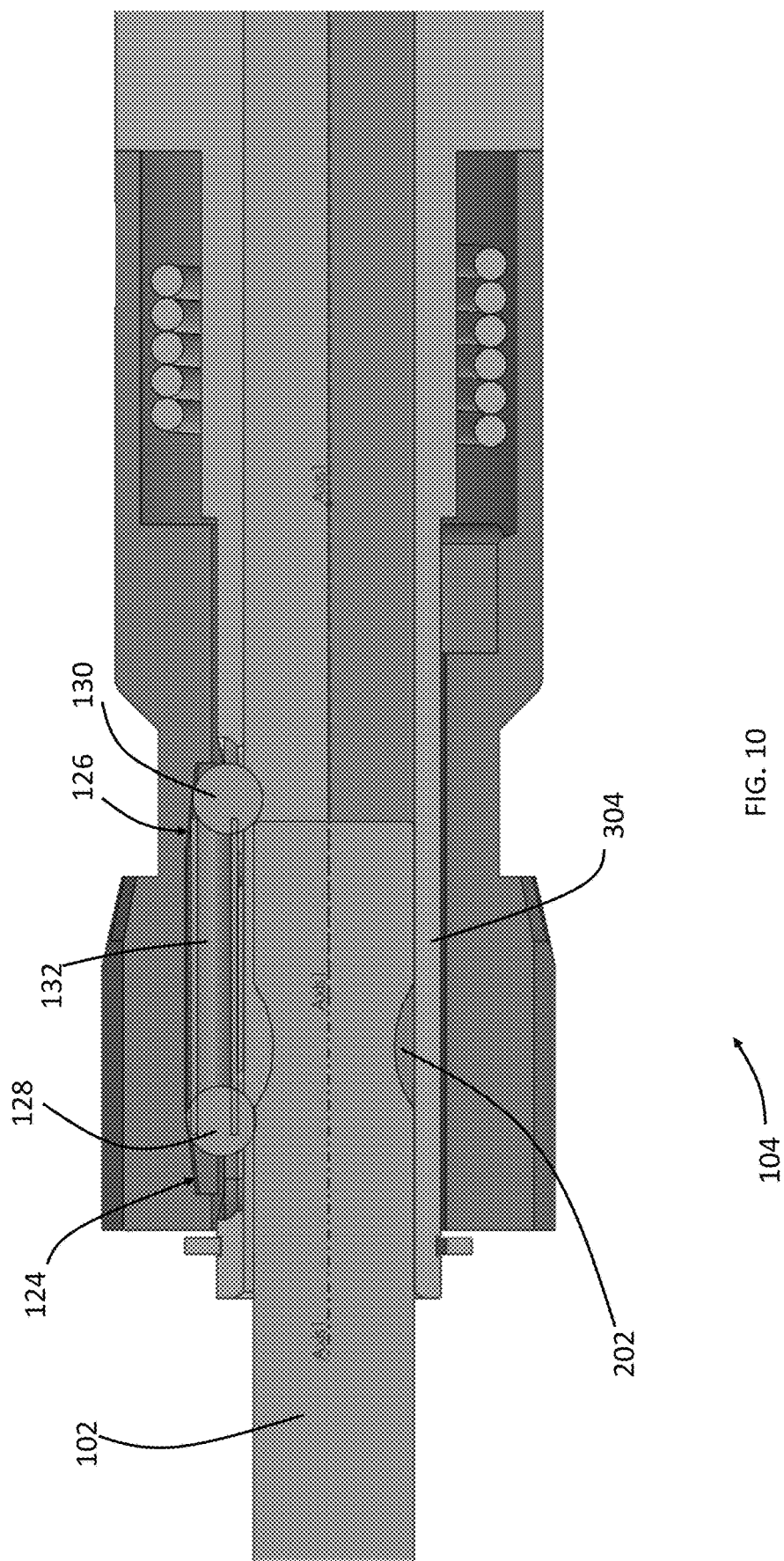
FIG. 10 depicts a cross-sectional view of driver handle and shank with quick connect operation in accordance with one or more aspects of the disclosure.

FIG. 10 presents a cross sectional view of quick connect operation of one or more aspects of the disclosure. The quick connect feature enables a user to insert a shank 102 into the handle 104 without any additional steps, manipulation of buttons, rings, levers, or the like. Once inserted to the position shown in FIG. 10, the shank 102 is fully connected to the handle 104 and the driver is ready for use by the user. The quick connect operation begins with the shank 102 outside the handle 104, in particular, outside the sleeve 304. At this time, a first retaining ball 128 is farther to the left and down from where it is depicted in FIG. 10 due to the force of compression spring 132 pushing the first retaining ball 128 leftward and sloping surface 124 pushing ball 128 toward the axis. As the shank 102 is inserted into the sleeve 304 (in FIG. 10, from left to right), the shank 102 encounters the first retaining ball 128 and pushes the ball upward and to the right to the position in FIG. 10. As the shank 102 continues insertion into sleeve 304, the shank encounters a second retaining ball 130 that prevents the shank 102 from being inserted further. At this point, the quick connect operation is complete, the shank 102 is secure in the handle 304, and the driver is ready for use. After the quick connect operation, adjusting the position of the shank 102 relative to the handle 304, either removing the shank or pushing the shank further into the handle, requires the additional operation of rotating the first outer handle portion relative to the second outer handle portion as described at other places herein. Further, in preferred embodiment for use with shanks having a retaining groove, like the shank 102 in FIG. 10, the spacing between the two retaining balls is greater than the distance between an engaged end of the shank and an end of the groove farthest from the engaged end of the shank. For example, for a standard ¼ inch shank with a retaining groove according to ASME B107.4, the spacing from the center of one of the retaining balls 128, 130 to the center of the other retaining ball 128, 130 should be at least 0.470 inch for the condition shown in FIG. 10.

Figure 11:
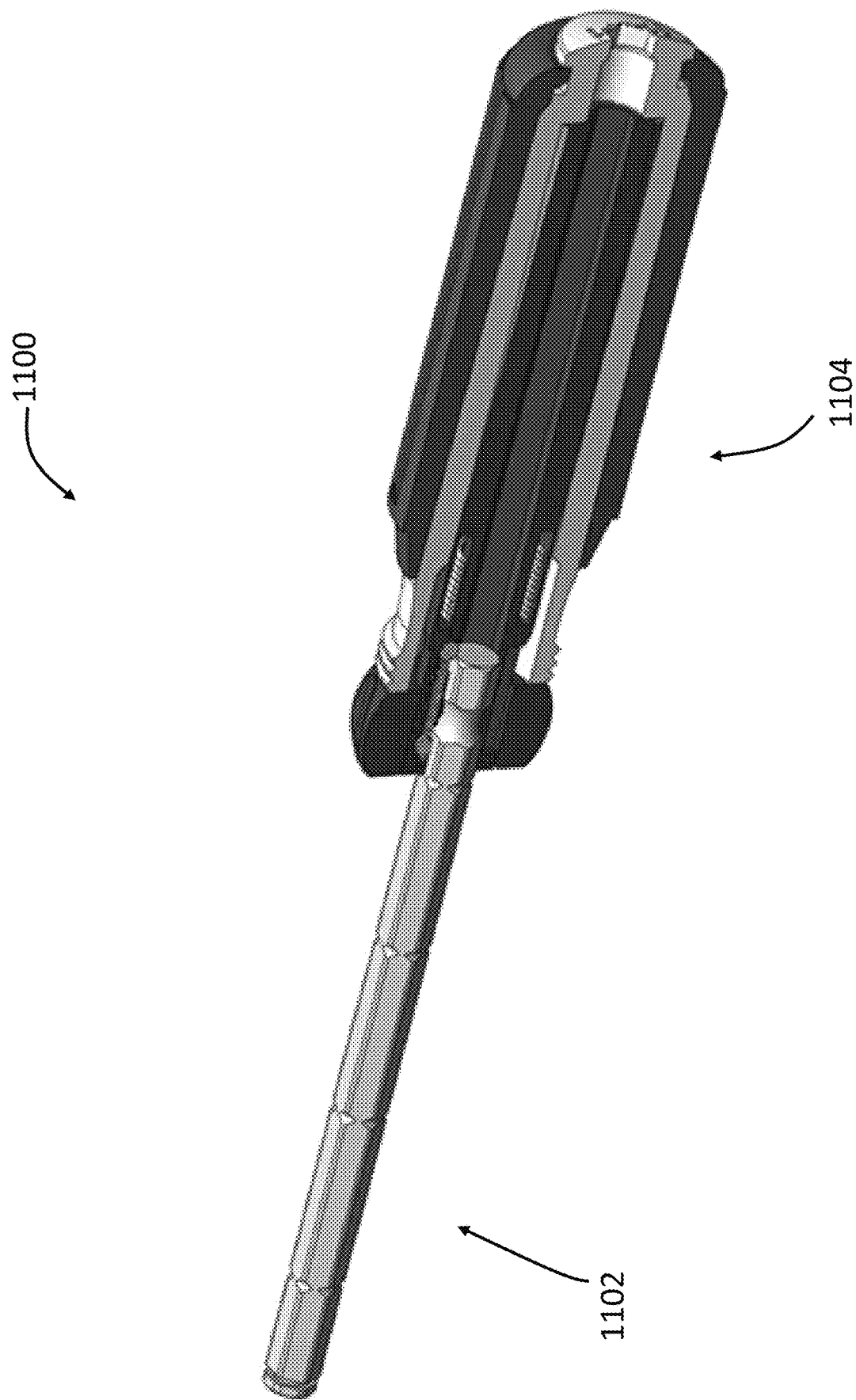
FIG. 11 depicts a partially cross-sectional perspective view of another embodiment of a driver handle and shank in accordance with one or more aspects of the disclosure.

FIG. 11 presents a partially cutaway view of a driver 1100. The driver 1100 includes a shank 1102 with an essentially hexagonal cross section. The shank 1202 is at partially inserted into the handle 1104.

Figure 12:
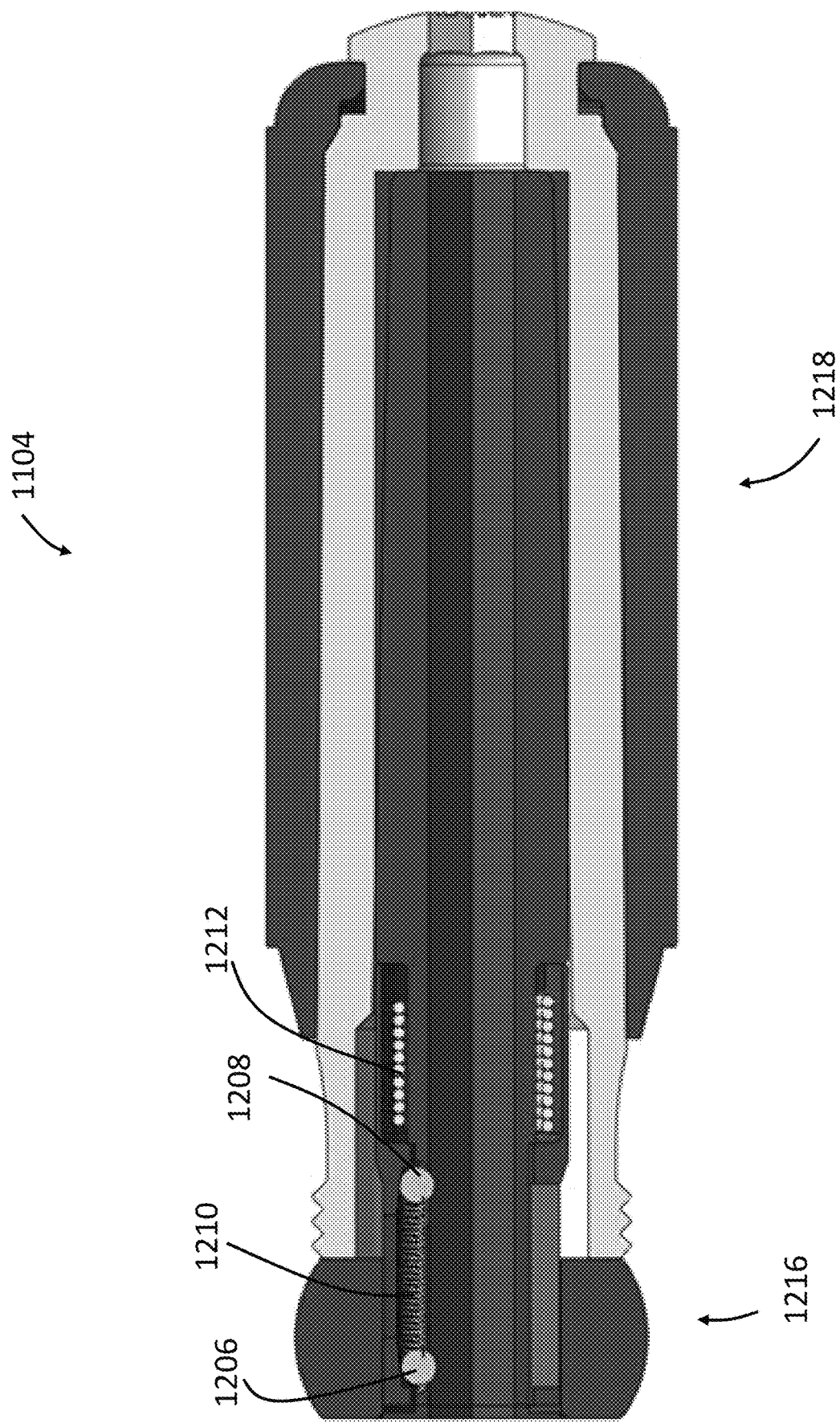
FIG. 12 depicts a cross-sectional view of another embodiment of a driver handle in accordance with one or more aspects of the disclosure.

FIG. 12 depicts a cross section view of the handle 1104. The handle 1104 includes first outer handle portion 1216 and second outer handle portion 1218. The first outer handle portion 1216 at least partially houses the two retaining balls 1206, 1208. In one or more embodiments, the two retaining balls 1206, 1208 and a compression spring 1210 disposed between the balls may be at least partially housed in both the first outer handle portion 1216 and the sleeve. A torsional spring 1212 is also present to return the rotated first outer handle portion 1216 to its neutral azimuthal orientation (or position).

Figure 13:
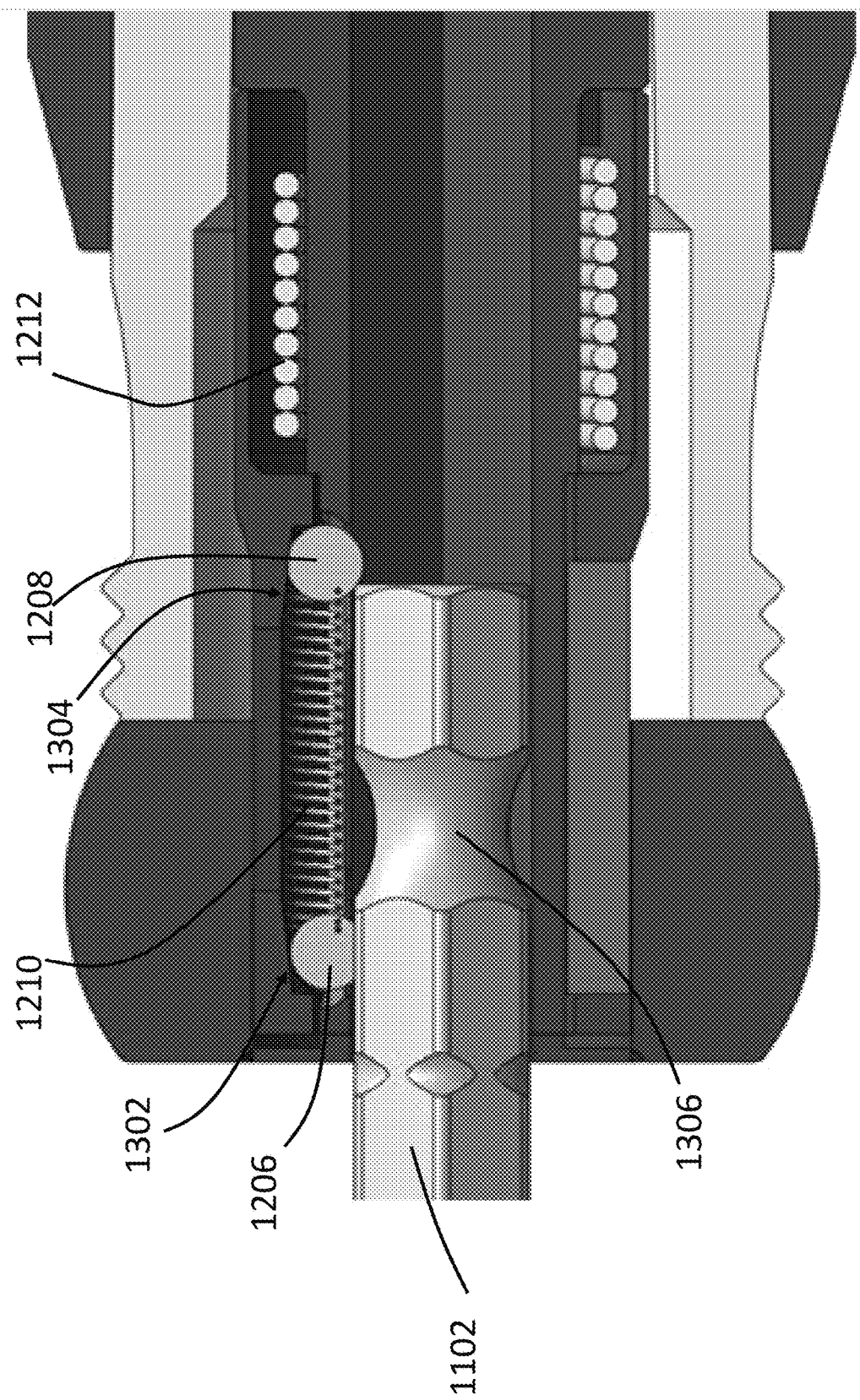
FIG. 13 depicts a partially cross-sectional view of another embodiment of a driver handle and shank with quick connect operation in accordance with one or more aspects of the disclosure.

FIG. 13 provides an enlarged view of a portion of FIG. 12. Shank 1102 includes notches and a groove 1306. The handle engagement end of the shank 1102 is rounded, though in some embodiments the shank is not rounded at the handle engagement end. The two retaining balls 1206, 1208 (with compression spring 1210 disposed between the balls) straddling the end of the shank 1102 and the groove 1306. Slanting surfaces 1302, 1304 from the first demi-chamber are also visible. Similar to FIG. 10, FIG. 13 illustrates the quick connect operation, in particular, the relation of the shank 1102 to the handle when the quick connect operation is completed.

Figure 14:
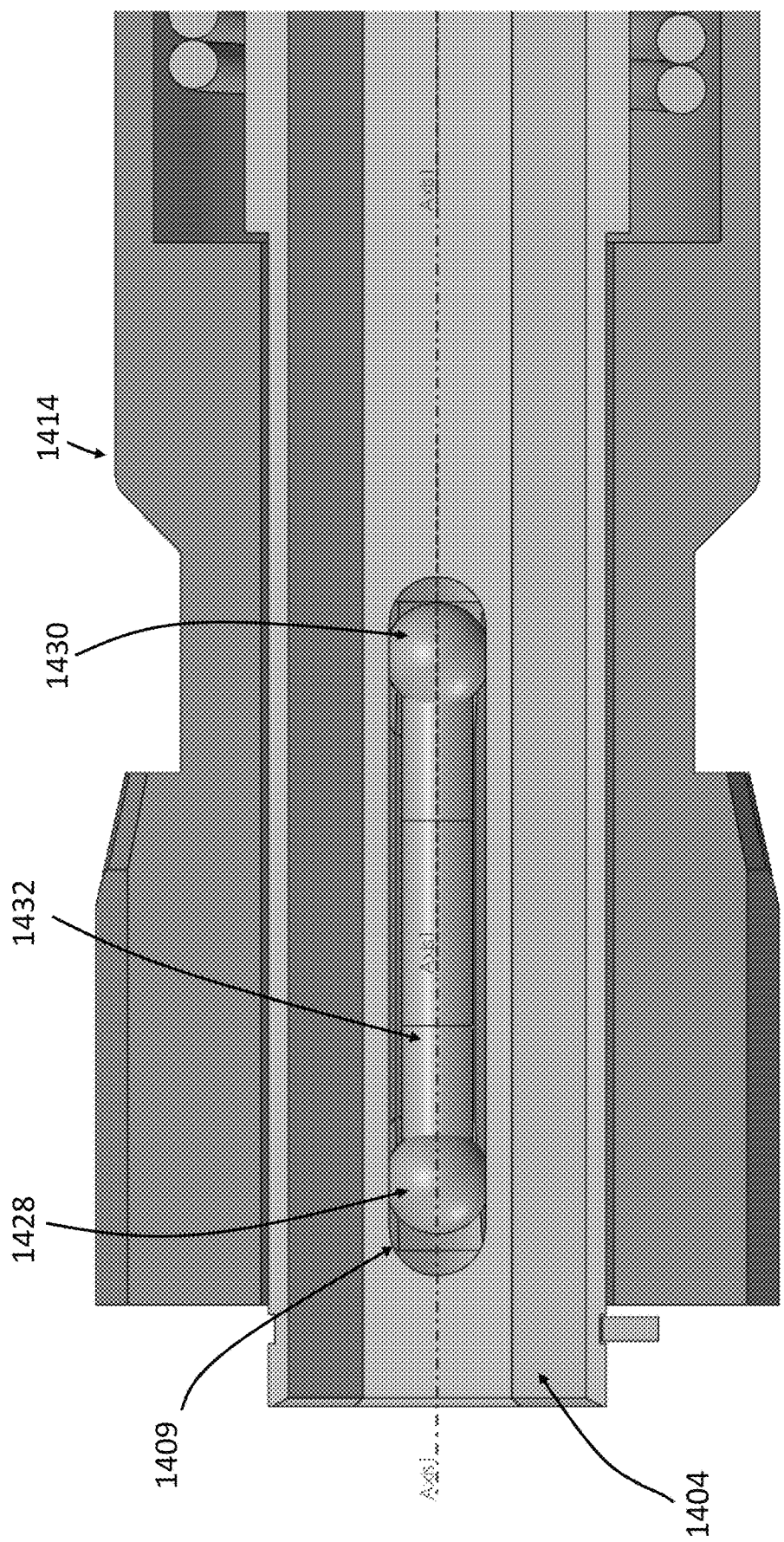
FIG. 14 depicts a cut-away view of another embodiment of a driver where two retaining balls are disposed in a single slot in the sleeve in accordance with one or more aspects of the disclosure.

Referring to FIG. 14, the driver may have a single slot 1409 in the sleeve 1404 that allows both retaining balls 1428, 1430 to make contact with a shank disposed in the sleeve 1404. Both retaining balls 1428, 1430 may ride along the single slot 1409. In this depiction a compressional spring 1432 is disposed between the two retaining balls 1428, 1430. A first outer handle portion 1414 is shown to provide context for the single slot 1409.

In one or more embodiments, a method of adjusting a position of a handle on the driver with respect to the shank includes rotating the first outer handle portion azimuthally away from the neutral azimuthal position with respect to the second outer handle portion. While maintaining a rotated position, slide the shank with respect to the handle to a selected position, and allow the first outer handle portion to return to the neutral azimuthal position.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. Furthermore, it should be understood that the depiction of the springs and retaining balls of the driver in FIGS. 3-10 and 14 is somewhat schematical/simplified and that the springs 132 and 1432 are helical compression springs that are depicted as cylindrical bodies for purposes of illustration and that the ends of the springs 132 do not actually extend into the retaining balls 128 and 130.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:
1. A driver comprising:
an axis;
a shank oriented along the axis and comprising:
 a tip end; and
 a handle engagement portion disposed opposite the tip end;
a handle configured to releasably and continuously adjustably fix the shank in position, the handle comprising:
 a sleeve that fits closely around the shank without unilaterally fixing the shank in position, the sleeve comprising two slots extending through the sleeve and oriented in an axial direction;
 a first outer handle portion configured to rotate about the axis and the sleeve and disposed over a first end of the sleeve, the first outer handle portion comprising a chamber oriented in the axial direction and opening to the two slots, the chamber comprising a first and a second demi-chamber, each demi-chamber oriented in the axial direction and azimuthally adjacent, the first demi-chamber comprising two oppositely sloping surfaces at opposite ends of the first demi-chamber, each sloping surface sloping toward the sleeve toward a respective end of the first demi-chamber, the second demi-chamber similar to the first demi-chamber but does not include sloping surfaces;
 a second outer handle portion adjacent to and axially fixed with respect to the first outer handle portion and disposed over a second end of the sleeve;
 an azimuthal orientation restorer operably engaged with the first and second outer handle portions and configured to restore a neutral azimuthal orientation between the first and second outer handle portions that fixes the position of the shank with respect to the handle; and
 two retaining balls at least partially disposed in the chamber and biased away from each other along the axis, each retaining ball partially disposed in a respective one of the slots, each retaining ball comprising a diameter greater than a width of the respective one of the slots and small enough in diameter to make contact with the shank via the respective one of the slots;
 wherein the two retaining balls occupy the first demi-chamber while the first and second outer handle portions are in the neutral azimuthal orientation, and, extend through the respective one of the slots to press and retain the shank against the sleeve, and wherein the two retaining balls occupy the second demi-chamber while the first outer handle portion is rotated azimuthally with respect to the second outer handle portion and allow the shank to move axially with respect to the handle.

2. The driver of claim 1, wherein at least a portion of the shank comprises a cross section perpendicular to the axis that is non-circular.

3. The driver of claim 2, wherein the cross section perpendicular to the axis comprises a polygon.

4. The driver of claim 3, wherein the polygon is a regular polygon.

5. The driver of claim 4, wherein the regular polygon is one of an equilateral triangle, a square, a hexagon, or an octagon.

6. The driver of claim 1, wherein:
the shank comprises a groove extending circumferentially around the shank, and
a spacing between the two retaining balls is greater than a distance between an engaged end of the shank and an end of the groove farthest from the engaged end of the shank.

7. The driver of claim 1, further comprising a fastener disposed at the first end of the sleeve that locks the sleeve axially with respect to the first and second outer handle portions,
wherein the sleeve comprises a circumferential notch around the outer surface of the sleeve, and wherein the fastener comprises a c-clip configured to securely fit in the circumferential notch.

8. The driver of claim 1, wherein the first outer handle portion further comprises a removable section disposed radially outward from at least a portion of the chamber, the removable section configured to pass one or more retaining ball and/or the compressive spring.

9. The driver of claim 1, wherein the shank comprises one or more of stainless steel, tool steel, carbon steel, alloy steel, iron, aluminum, tungsten, or titanium.

10. The driver of claim 1, wherein the sleeve comprises one or more of stainless steel, tool steel, carbon steel, alloy steel, iron, aluminum, tungsten, or titanium.

11. The driver of claim 1, wherein the first and/or second outer handle portion comprises one or more of polypropylene, acrylonitrile butadiene styrene, cellulose acetate, polycarbonate, polyvinyl chloride, polyethylene, polystyrene, polyamide, fiberglass, acetal, acrylic, wood, stainless steel, tool steel, carbon steel, alloy steel, iron, aluminum, tungsten, or titanium.

12. The driver of claim 1, wherein the retaining balls comprise one or more of steel, stainless steel, tool steel, carbon steel, alloy steel, iron, aluminum, tungsten, or titanium.

13. The driver of claim 1, wherein the azimuthal orientation restorer is a torsion spring and the two retaining balls are biased away from each other by a compression spring.

14. The driver of claim 13, wherein the torsional spring and/or the compression spring comprise one or more of spring steel.

15. The driver of claim 1, wherein the sleeve comprises an outer surface in the shape of a cylinder or a regular polygon.

16. The driver of claim 1, wherein the two slots are defined by a single slot extending parallel to the axis.

17. The driver of claim 1, wherein the two retaining balls are disposed on opposite ends of a compressible spring configured to compress elastically along a line between the two retaining balls.

18. A method of adjusting a position of the handle on the driver of claim 1, the method comprising:
rotating the first outer handle portion azimuthally away from the neutral azimuthal position with respect to the second outer handle portion;
while maintaining a rotated position, sliding the shank with respect to the handle to a selected position; and
allowing the first outer handle portion to return to the neutral azimuthal position.

19. A quick connect method for attaching the shank to the handle of the driver of claim 1, the quick connect method consisting of:
inserting the shank into the sleeve of the handle until further insertion is prevented.

* * * * *